(No Model.) 2 Sheets—Sheet 1.
C. R. MELLOR.
CENTRIFUGAL MACHINE FOR SEPARATING LIQUIDS.
No. 334,713. Patented Jan. 19, 1886.
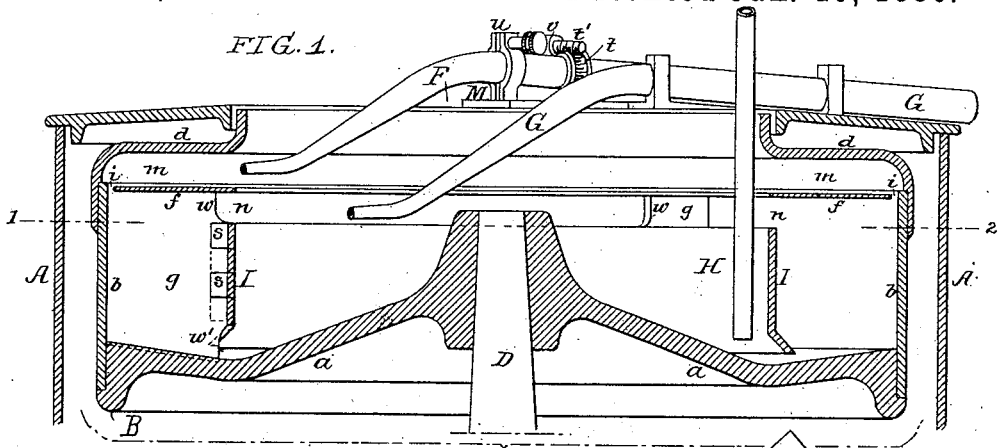
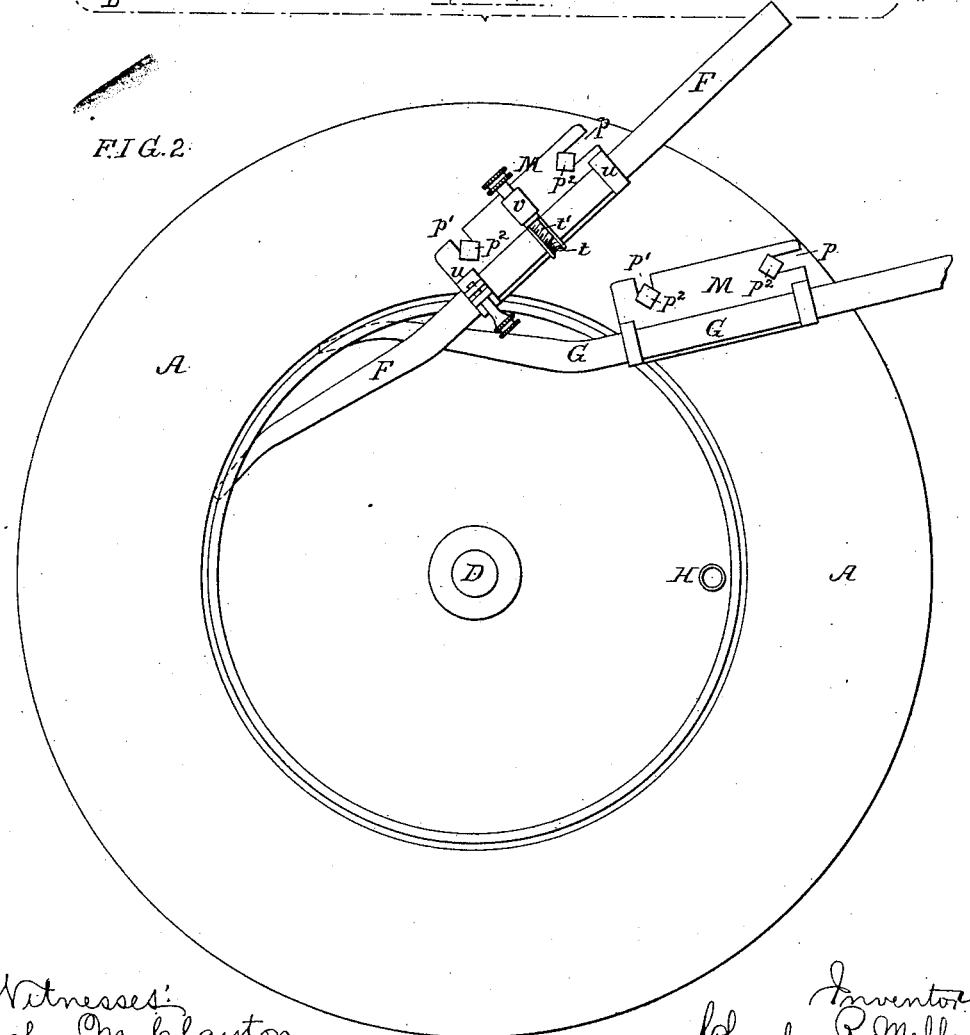
Witnesses:
John M. Clayton
James F. Tobin
Inventor:
Charles R. Mellor
by his Attorneys
Howson and Sons (No Model.) 2 Sheets—Sheet 2.

C. R. MELLOR.
CENTRIFUGAL MACHINE FOR SEPARATING LIQUIDS.

No. 334,713. Patented Jan. 19, 1886.

UNITED STATES PATENT OFFICE.

CHARLES R. MELLOR, OF PHILADELPHIA, PENNSYLVANIA, ASSIGNOR OF ONE-FOURTH TO CHARLES H. MELLOR, OF SAME PLACE.

CENTRIFUGAL MACHINE FOR SEPARATING LIQUIDS.

SPECIFICATION forming part of Letters Patent No. 334,713, dated January 19, 1886.

Application filed June 19, 1884. Serial No. 135,410. (No model.)

*To all whom it may concern:*

Be it known that I, CHARLES R. MELLOR, a citizen of the United States, and a resident of Philadelphia, Pennsylvania, have invented certain Improvements in Centrifugal Machines for Separating Liquids, of which the following is a specification.

My improvements, while applicable to centrifugal separators generally, will be described as applied to a machine for separating cream from milk, this being the special purpose for which the improvements were devised.

The main object of my improvements is to increase the capacity of the machine by effecting the thorough separation of the cream from the milk, in less time and by the use of a shallower cylinder than usual, further objects being to permit the escape of the cream and milk in as direct a course as possible, and to prevent the access of air to the inner surface of the liquid contents of the cylinder. These objects I attain in the manner hereinafter set forth, reference being had to the accompanying drawings, in which—

Figure 4:
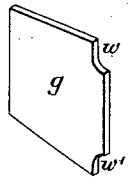
Figure 3:
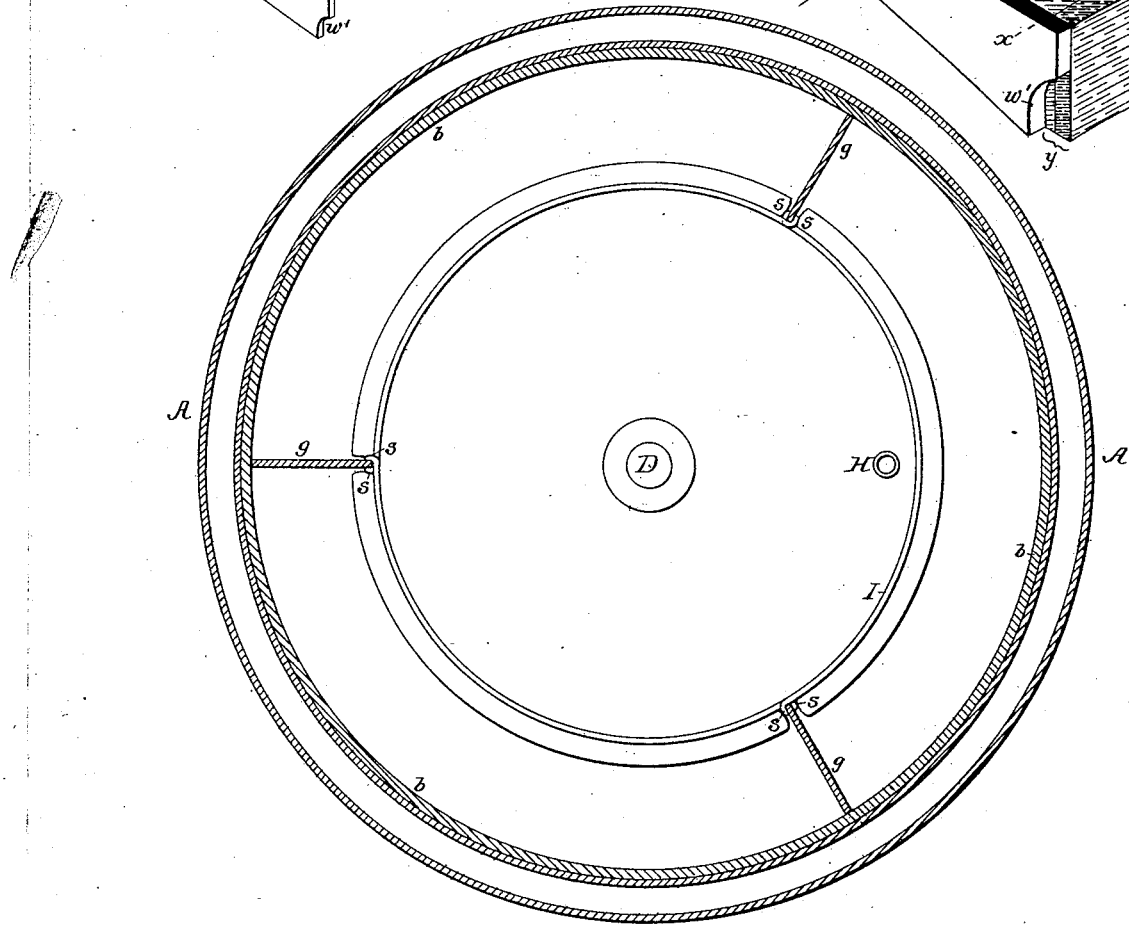

Figure 1, Sheet 1, is a vertical section, partly in elevation, of a centrifugal cream-separator with my improvements; Fig. 2, a plan view of the same; Fig. 3, Sheet 2, a sectional plan on the line 1 2, Fig. 1; Fig. 4, a perspective view of part of the device, and Fig. 5 a perspective diagram illustrating one of the features of my invention.

A is the fixed outer casing of the apparatus, and B the revolving cylinder, which is mounted upon the upper end of the driving-spindle D, and comprises the solid bottom *a*, annular shell *b*, hood *d*, and retaining-plate *f*, and a series of radial plates, *g*, as usual, a contracted annular space, *i*, intervening between the shell *b* and the edge of the plate *f*, so as to permit the escape of the milk into the chamber *m* above the plate *f*, from which it is withdrawn through a pipe, F, arranged tangentially, as shown in Fig. 2.

The milk, being heaviest, seeks the outer portion of the cylinder, owing to the centrifugal action, the cream accumulating on the inner surface of the milk and rising to the chamber *n* beneath the plate *f*, from which it is withdrawn through a tangential pipe, G.

The milk is introduced into the cylinder B through a pipe, H, and passes under the lower flaring edge of an annular casing, I, the milk at once seeking the outer portion of the cylinder, and the cream, owing to its less specific gravity, remaining close to the partition and rising into the space *n*.

Figure 5:
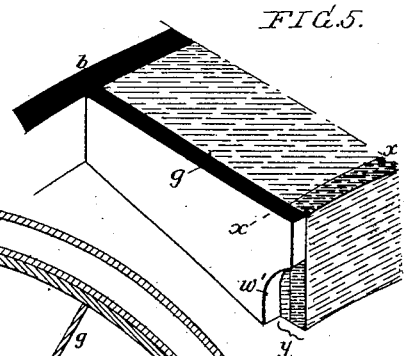

The radial plates *g* are used to prevent the whirling of the liquid in the cylinder, or, in other words, to insure the rotation of all portions of the liquid at precisely the same speed as that of the cylinder; but hitherto these plates have only been carried inward to the line of separation of the milk and cream— that is to say, to about the line *x*, Fig. 5—so as not to interfere with the projection of the pipe G into the cream. In consequence of this the stream of milk, on issuing from the pipe H, is not under the influence of the plates *g*, and there is always a spiral whirling motion in this portion of the liquid, so that the thorough separation of the cream from the milk is impossible. This objection I overcome by extending the plates *g* to or beyond the inner surface of the liquid contents of the cylinder B, so that all portions of the same are under the influence of said plates, whirling of any portion of the liquid being thus prevented, and ample time afforded for the separation of the cream from the milk by centrifugal action while the liquid is rising from the bottom to the top of the cylinder. By this means I am enabled to use a cylinder of six inches or less in depth in place of the much deeper cylinders now used.

The upper inner corner of each plate *g* has a notch, *w*, for the reception of the end of the discharge pipe G, and the lower inner corner of each plate has also a notch, *w'*, the object of which is to insure the maintenance around the entire cylinder of a volume, *y*, of liquid, as shown in Fig. 5, into which the pipe H may discharge. In the absence of this provision the milk escaping from the pipe H would come into contact with the inner edges of the plates *g*, and thus cause the milk to form, thereby interfering with the perfect separation of the cream.

The plates *g* in the present instance extend to the inner casing, I, the latter having lugs *s* formed upon it to embrace the inner edges of the plates by which the casing is supported.

The plates may, however, be used without the inner casing, if desired, the main function of this casing being to cut off the access of air to the surface of the cream, and thus supplement the action of the plates g in preventing the frothing or churning of the cream.

The discharge-pipes F and G are smallest in diameter at the inner or receiving end, and gradually increase in diameter from this point, so as to provide a free discharge for the liquid entering the pipes.

By arranging the pipes tangentially, as shown, the milk and cream are permitted to escape from the cylinder B almost in a direct course, and the discharge is thereby further facilitated.

Each of the pipes F and G is carried by a bracket, M, secured to the top of the outer casing, A, so as to hold the pipes in the proper tangential position, the brackets having slots $p$ $p'$ for the reception of the confining-bolts $p^2$, so that the pipes can be readily applied to or removed from the casing. The inner end of the pipe F is also adjustable in the arc of a circle, to effect such an adjustment of said pipe as will insure the best results. The end of the pipe is bent to form a crank, and the body of the pipe is provided with a worm-wheel, $t$, which engages with a worm, $t'$, carried by a stud, $v$, on the bracket M, so that by turning this worm the pipe F may be partly rotated in its bearings $u$, and the inner end of the pipe thus caused to swing. One of the bearings $u$ is split and provided with a clamping screw, so that the pipe may be held in any position to which it has been adjusted.

I claim as my invention—

1. The combination of the cylinder of a centrifugal separator, having an inner and outer discharge, with the partition-plates $g$, secured to and rotating with the said cylinder and extending inward to or beyond the limit of the inner discharge, whereby all portions of the liquid contents of the cylinder are prevented from whirling when the cylinder is rotated.

2. The combination of the rotating cylinder B of a centrifugal separator, a discharge-pipe which does not partake of the rotary motion of the cylinder, and partition-plates $g$, secured to and rotating with the cylinder, and having notches $w$ at the upper inner corners for the reception of said pipe, as set forth.

3. The combination of the cylinder B of a centrifugal separator, having inner and outer discharge, the supply-pipe, and the plates $g$, secured to and rotating with the cylinder and projecting inward to or beyond the limit of the inner discharge, but notched so as to terminate before reaching this limit at the point where the incoming stream joins the volume rotating with the cylinder, as set forth.

4. The combination of the cylinder B of a centrifugal separator and its inner discharge with the inner casing, I, secured to and rotating with the cylinder and occupying a position within the line of discharge, whereby churning action of the air on the inner surface of the liquid contents of the cylinder is prevented, as set forth.

5. The combination of the cylinder B, the plates $g$, secured to and revolving with the cylinder, and the internal casing, I, connected to the said plates and having an opening below for the passage of liquid, as set forth.

6. The combination of the cylinder B, the outer casing, A, the discharge-pipe, a bracket carrying the said pipe and having a longitudinal slot, $p$, and a transverse slot, $p'$, and securing-bolts adapted to said slots, as set forth.

In testimony whereof I have signed my name to this specification in the presence of two subscribing witnesses.

CHARLES R. MELLOR.

Witnesses:
JOHN M. CLAYTON,
HARRY SMITH.

Correction in Letters Patent No. 334,713.

It is hereby certified that in Letters Patent No. 334,713, granted January 19, 1886, upon the application of Charles R. Mellor, of Philadelphia, Pennsylvania, for an improvement in "Centrifugal Machines for Separating Liquids," an error appears in the printed specification requiring correction as follows: In line 96, page i, the word "form" should be stricken out and the word *foam* inserted instead; and that the said Letters Patent should be read with this correction therein that the same may conform to the record of the case in the Patent Office.

Signed, countersigned, and sealed this 2d day of February, A. D. 1886.

[SEAL.]

H. L. MULDROW,
*Acting Secretary of the Interior.*

Countersigned:
M. V. MONTGOMERY,
*Commissioner of Patents.*